(12) United States Patent
Gary et al.

(10) Patent No.: US 6,325,344 B1
(45) Date of Patent: Dec. 4, 2001

(54) WINDOW WREATH HANGER

(75) Inventors: Lonnie F. Gary, Ransom Canyon; Stephen L. Fillipp; Chad H. Jones, both of Lubbock, all of TX (US)

(73) Assignee: Gary Products Group, Inc., Lubbock, TX (US)

(*) Notice: Subject to any disclaimer, the term of this patent is extended or adjusted under 35 U.S.C. 154(b) by 0 days.

(21) Appl. No.: 09/499,785

(22) Filed: Feb. 8, 2000

(51) Int. Cl.$^7$ .................................................. A45D 42/14
(52) U.S. Cl. ........................................ 248/206.3; 248/362
(58) Field of Search ............................. 248/205.8, 206.1, 248/206.2, 206.3, 205.5, 205.6, 362, 363, 683, 690, 692

(56) References Cited

U.S. PATENT DOCUMENTS

| | | | |
|---|---|---|---|
| D. 266,124 | 9/1982 | Stankewich | D6/120 |
| D. 287,816 | 1/1987 | Chasen | D8/367 |
| D. 289,139 | 4/1987 | Chasen | D8/367 |
| D. 308,015 | 5/1990 | Volpe et al. | D8/367 |
| D. 317,115 | 5/1991 | Gary | D8/373 |
| D. 321,314 | 11/1991 | Gary | D8/373 |
| D. 331,360 | 12/1992 | Adams | D8/373 |
| D. 361,930 | 9/1995 | Fillipp et al. | D8/367 |
| D. 373,948 | 9/1996 | Etzel et al. | D8/367 |
| 840,618 | 1/1907 | Golombek | 248/205.5 |
| 2,139,805 | 12/1938 | Chase | 248/205.5 |
| 4,120,472 | 10/1978 | Baine | 248/211 |
| 4,392,191 | 7/1983 | White, Sr. | 362/392 |
| 4,468,721 | 8/1984 | Vandrilla | 362/392 |
| 4,588,153 | 5/1986 | Boston et al. | 248/74.2 |
| 4,607,875 | 8/1986 | McGirr | 296/97 D |
| 4,839,784 | 6/1989 | Lin | 362/393 |
| 4,852,832 | 8/1989 | Delaney | 248/65 |
| 4,877,209 | 10/1989 | Gary | 248/205.3 |
| 4,887,785 | 12/1989 | Blaich | 248/339 |
| 4,901,960 | 2/1990 | Gary | 248/205.3 |
| 4,957,254 * | 9/1990 | Hill et al. | 248/207 |
| 4,986,504 | 1/1991 | Gary | 248/205.3 |
| 5,028,026 | 7/1991 | Phillips et al. | 248/206.2 |
| 5,087,005 * | 2/1992 | Holoff et al. | 248/362 X |
| 5,110,078 * | 5/1992 | Gary | 248/206.2 |
| 5,141,192 | 8/1992 | Adams | 248/231.8 |
| 5,199,781 | 4/1993 | Sweeny | 362/145 |
| 5,246,193 * | 9/1993 | Faidley | 248/206.3 |
| 5,422,803 | 6/1995 | Kilgore | 362/392 |
| 5,613,659 * | 3/1997 | Hong | 248/205.5 |
| 5,715,876 * | 2/1998 | Burt | 248/206.3 X |
| 5,820,116 * | 10/1998 | Haese | 248/362 X |
| 6,186,415 * | 2/2001 | Sanders | 248/206.2 X |

OTHER PUBLICATIONS

Adams Product Brochure, 1993.

* cited by examiner

Primary Examiner—Ramon O. Ramirez
Assistant Examiner—Tan Le
(74) Attorney, Agent, or Firm—Locke Liddell & Sapp LLP; Monty L. Ross

(57) ABSTRACT

An injection molded plastic hanger that, in the preferred embodiment, has a generally triangular body with a unitarily molded hook member at one corner and suction cup attachment devices at the other two corners. The hanger is constructed to have a low profile relative to a smooth support surface, meaning that the body and suction cup attachment devices are specially adapted to permit attachment of suction cups to the body in such manner that the body remains close to the support surface when the suction cups are subsequently attached to the support surface. The suction cup attachment devices include a retainer ring and a stud support member that assist in retaining engagement between the hanger and the suction cup when the hanger is subjected to a shear force.

6 Claims, 1 Drawing Sheet

WINDOW WREATH HANGER

BACKGROUND OF THE INVENTION

1. Field of the Invention

This invention relates to hangers useful for supporting objects such as wreaths or other decorative or functional items from a smooth surface, and more particularly, to a low-profile molded plastic hanger that is attachable by suction cups to a smooth surface such as glass.

2. Description of Related Art

The use of hooks attached to suction cups for hanging lightweight articles from smooth, upright surfaces such as glass windows, doors and mirrors is well known. Hangers with suction cups are known to be advantageous for use on glass surfaces because they are easily attachable and do not scratch the glass or leave a residue when subsequently removed. Suction cups are usually attached to hooks or other hanger structures by frictional engagement between a flexible, cylindrical boss molded onto the convex side of the suction cup and a stud projecting from the rear of the hook or hanger.

One disadvantage of conventional hangers using suction cups as the attachment apparatus is that the weight of the supported object can cause the suction cup to detach from the smooth underlying surface. In the past, the makers of such hangers have sought to overcome this disadvantage by providing hangers having larger suction cups or more than one suction cup to support heavier objects. Another disadvantage that has been experienced is that heavier objects can cause the hook or other support member to which the hook is attached to pull out of the suction cup even though the suction cup itself has not become detached from the support surface.

SUMMARY OF THE INVENTION

The invention disclosed herein is an injection molded plastic hanger that, in the preferred embodiment, has a generally triangular body with a unitarily molded hook member at one corner and suction cup attachment devices at the other two corners. The hanger is constructed to have a low profile relative to a smooth support surface, meaning that the body and suction cup attachment devices are specially adapted to permit attachment of suction cups to the body in such manner that the body remains close to the support surface when the suction cups are subsequently attached to the support surface.

As used throughout this disclosure, the terms "front," "forward" or "forwardly" mean facing away from the smooth support surface to which the suction cups are applied during use, and the terms "back," "rear" or "rearwardly" mean facing the support surface.

According to a particularly preferred embodiment of the invention, the suction cup attachment device further comprises a circumferentially extending retainer ring lying substantially in the plane of the body, an arched, forwardly projecting stud support member connected to the retainer ring at diametrically opposed positions and bridging the retainer ring, and a tapered, substantially cylindrical solid stud projecting rearwardly from the midpoint of the stud support member. When a suction cup is attached to one of the suction cup attachment devices on the hanger of the invention, the cylindrical boss on the suction cup is pressed onto the stud, and projects outward through the principal plane of the hanger body into the "cage" formed by the retainer ring in combination with the stud support member.

The suction cup hanger of the invention is believed to function better than those disclosed in the prior art for at least three reasons: First, the shape of the reinforced triangular body provides structural stability and improves load distribution when the hanger is attached to a surface and supporting a load. Second, because the stud support members of the suction cup attachment devices project forwardly above the major plane of the body, the body plane and the center of gravity of the hanger and the supported load are moved closer to the plane of the support surface. This in turn reduces the tendency of the suction cups to pull away from the support surface to which they are applied when the hanger is under load. Third, because the outside surface of the cylindrical boss on the suction cup is closely contained inside the "cage" formed by the stud support member and the retainer ring, the boss of the suction cup is less likely to release from the stud when a shear force is applied to the hanger as, for example, when the hanger is under load. As the body of the hanger is pulled in a direction perpendicular to the axis through the cylindrical boss of the suction cup, instead of pulling away from one side of the stud, the boss of the suction cup will be "pinched" between the stud and the retainer ring.

BRIEF DESCRIPTION OF THE DRAWINGS

The apparatus of the invention is further described and explained relation to the following figures of the drawings wherein.

Like reference numerals are used to indicate like parts in all figures of the drawings.

DESCRIPTION OF THE PREFERRED EMBODIMENTS

Figure 1:
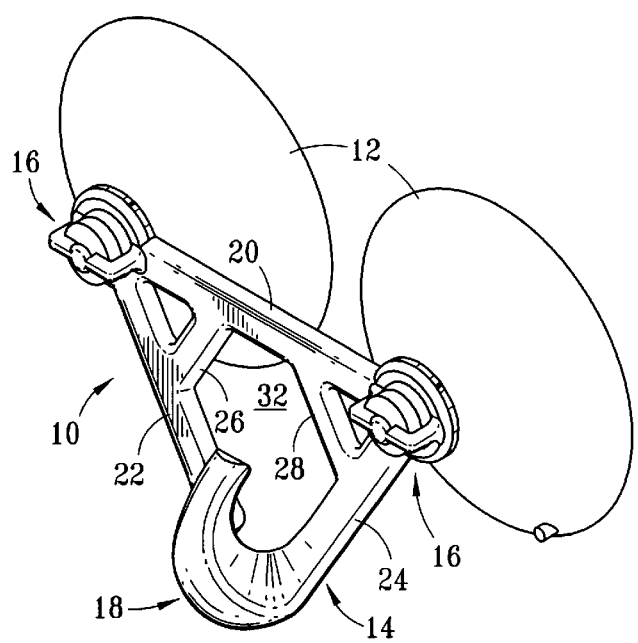
FIG. 1 is a perspective view of a preferred embodiment of the hanger of the invention having suction cups attached to each of the two suction cup attachment devices.

Referring to FIG. 1, hanger 10 of the invention is shown with attached suction cups 12 in the same orientation in which hanger 10 is used to support a load such as a holiday wreath in front of the face of a smooth, substantially vertical support surface. Although hanger 10 can be generally referred to as a "wreath hanger," it will be apparent to those of skill in the art upon reading this disclosure that the subject hanger is similarly useful for hanging other objects. Also, while glass surfaces such as windows, doors and mirrors are likely candidates for the support surfaces to which hanger 10 is attachable using suction cups, it will be appreciated that other smooth surfaces such as those made of marble, polished metal or plastic are similarly useful provided that the suction cups will adhere to such surface.

Referring to FIGS. 1 and 4–7, hanger 10 preferably comprises body 14, suction cup attachment devices 16, and hook 18. Body 14 further comprises triangularly arranged frame members 20, 22, 24 and reinforcing members 26, 28. According to one particularly preferred embodiment of the invention, reinforcing member 26 is substantially parallel to frame member 24 and reinforcing member 28 is substantially parallel to frame member 22. Although frame members 20, 22, 24 and reinforcing members 26, 28 are provided with voids 30, 32, 34 therebetween to reduce the weight of hanger 10, it is understood that hangers embodying the suction cup attachment devices of the invention can also be made using a solid and continuous web of material in place of the frame members and reinforcing members of body 14. Body 14 is preferably injection molded from any suitable, durable thermoplastic polymeric material. Acrylic plastics or polycarbonate are particularly preferred for use in the invention. Where hanger 10 is intended for outdoor use in cold weather, moldable plastics having good cold weather properties are preferred.

Suction cup attachment devices 16 are desirably provided at two corners of body 14, and hook 18 is provided at the remaining corner of body 14. While a triangular body 14 is preferred, it will be appreciated after reading this disclosure that some advantages of the subject invention can likewise be achieved by making a hanger with a body having a shape other than triangular while still using the suction cup attachment devices of the invention. Likewise, although the use of two suction cup attachment devices on the subject hanger is preferred, it is possible to utilize the suction cup attachment device substantially as disclosed herein with only one, or with more than two, such devices per hanger. This is particularly true where body 14 has a configuration other than triangular.

Hook 18 is preferably molded with a substantially curved profile to reduce stress concentrations in the molded article, particularly in the region of attachment to body 14, when hook 18 is placed under load during use. It will also be appreciated upon reading this disclosure that a different load support structure such as, for example, a molded clip structure can likewise be molded onto body 14 for use with suction cup attachment devices 16 as disclosed herein.

Figure 2:
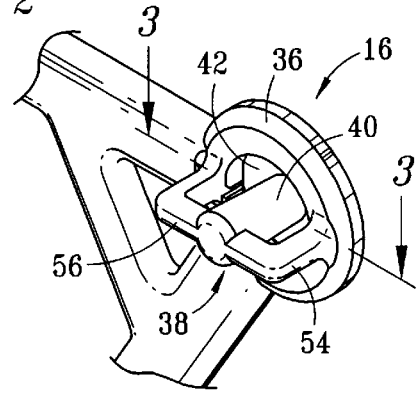
FIG. 2 is an englarged perspective view of one of the suction cup attachment devices, broken away from the remainder of the hanger body.
Figure 3:
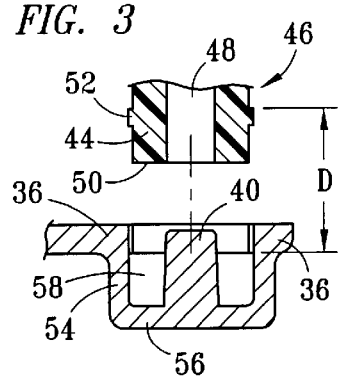
FIG. 3 is a cross-sectional detail view of the suction cup attachment device taken along line 3—3 of FIG. 2, and also showing a cross-sectional view of a broken-away, cylindrical boss portion of a suction cup.
Figure 4:
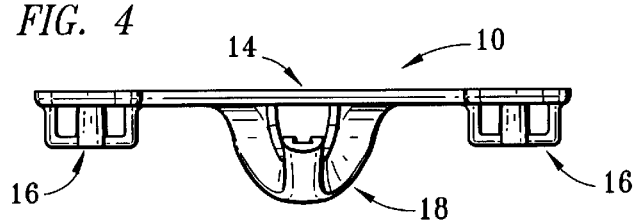
FIG. 4 is a top plan view of the hanger of the invention (shown without attached suction cups)
Figure 5:
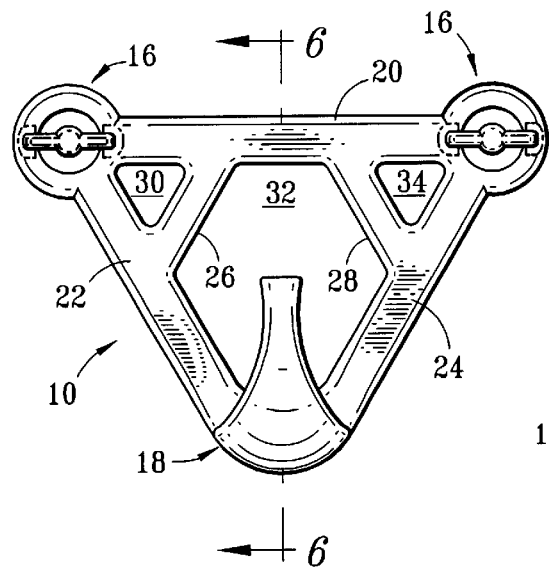
FIG. 5 is a front elevation view of the hanger of the invention.
Figure 6:
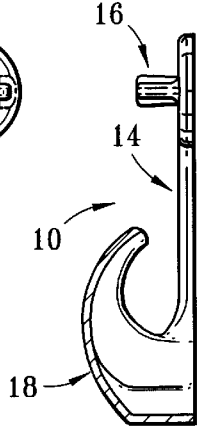
FIG. 6 is a right side elevation view of the hanger of FIG. 5.
Figure 7:
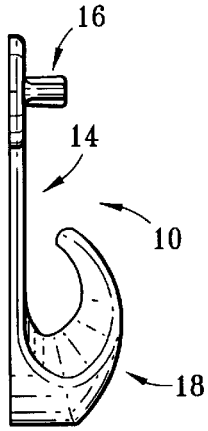
FIG. 7 is a left side elevation view of the hanger of FIG. 5.

Suction cup attachment devices 16 are further described and explained in relation to FIGS. 1–3. Suction cup devices 16 each preferably further comprise retainer ring 36, stud support member 38 and stud 40. Retainer ring 36 preferably lies in substantially the same plane as body 14 and defines an aperture 42 having a diameter slightly greater than the outside diameter of boss 44 of suction cup 12 when boss 44 is applied over stud 40. Boss 44 is typically made of a pliable, elastomeric, polymeric material with a substantially cylindrical side wall 46 defining recess 48 and terminating at forwardly facing end 50. The unexpanded inside diameter of side wall 46 is preferably slightly less than the outside diameter of stud 40 to facilitate tight frictional engagement therebetween when boss 44 is applied over stud 40 during attachment of suction cup 12 to suction cup attachment device 16. Annular boss 52 can be provided on the outside surface of side wall 46 if desired to provide further reinforcement and to enhance frictional engagement between boss 44 and retainer ring 36 or legs 54 of stud support member 38 as discussed below.

Stud support member 38 preferably further comprises legs 54 and beam 56, which cooperate to form a forwardly extending "arch" that bridges retainer ring 36. Stud 40 projects rearwardly from beam 56, most preferably for a distance that does not extend rearwardly behind the plane of retainer ring 36. Stud 40 preferably tapers slightly inward as it projects from beam 56 to facilitate molding. The space 58 between legs 54 and stud 40, and the annular space defined by retainer ring 36 and stud 40, are preferably slightly greater than the expanded outside diameter of boss 44 of suction cup 12. While two legs 54 connected to retainer ring 36 in diametrically opposed positions are disclosed herein as being preferred for use in the invention, it will be appreciated that additional legs can also be provided.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A hanger comprising a body, at least one suction cup attachment device and a load support member,
   wherein the suction cup attachment device further comprises a retainer ring, a stud support member and a stud, the stud support member being disposed forwardly of the retainer ring and the stud projecting rearwardly from the stud support member inside the retainer ring,
   the stud support member further comprising at least two legs and a beam, the legs projecting forwardly from the retainer ring and the beam extending transversely to connect the legs.

2. The hanger of claim 1 wherein the body is triangular and comprises a plurality of frame members.

3. The hanger of claim 2 comprising two suction cup attachment devices.

4. The hanger of claim 1 wherein the body, suction cup attachment device and load support member are unitarily molded from a thermoplastic resin.

5. The hanger of claim 1 wherein the stud support member comprises two legs attached to the retainer ring at positions that are diametrically opposed on the retainer ring.

6. The hanger of claim 1 wherein the load support member is a hook.

* * * * *